United States Patent
Sakariya et al.

(10) Patent No.: US 9,558,721 B2
(45) Date of Patent: Jan. 31, 2017

(54) CONTENT-BASED ADAPTIVE REFRESH SCHEMES FOR LOW-POWER DISPLAYS

(71) Applicants: Kapil V. Sakariya, Los Altos, CA (US); Andreas Bibl, Los Altos, CA (US)

(72) Inventors: Kapil V. Sakariya, Los Altos, CA (US); Andreas Bibl, Los Altos, CA (US)

(73) Assignee: Apple Inc., Cupertino, CA (US)

(*) Notice: Subject to any disclaimer, the term of this patent is extended or adjusted under 35 U.S.C. 154(b) by 450 days.

(21) Appl. No.: 13/652,049

(22) Filed: Oct. 15, 2012

(65) Prior Publication Data

US 2014/0104243 A1    Apr. 17, 2014

(51) Int. Cl.
| | | |
|---|---|---|
| G09G 5/399 | (2006.01) | |
| G09G 5/00 | (2006.01) | |
| G06F 3/14 | (2006.01) | |
| G09G 3/20 | (2006.01) | |
| G09G 3/32 | (2016.01) | |

(52) U.S. Cl.
CPC .............. *G09G 5/399* (2013.01); *G06F 3/14* (2013.01); *G09G 3/20* (2013.01); *G09G 3/3216* (2013.01); *G09G 3/3233* (2013.01); *G09G 5/005* (2013.01); *G09G 2300/026* (2013.01); *G09G 2310/0213* (2013.01); *G09G 2320/0613* (2013.01); *G09G 2330/021* (2013.01); *G09G 2340/0435* (2013.01); *G09G 2350/00* (2013.01); *G09G 2360/18* (2013.01); *G09G 2370/08* (2013.01)

(58) Field of Classification Search
CPC ....................................................... G09G 3/36

USPC ........................................ 345/204, 691, 690
See application file for complete search history.

(56) References Cited

U.S. PATENT DOCUMENTS

| | | |
|---|---|---|
| 4,618,814 A | 10/1986 | Kato et al. |
| 4,997,196 A | 3/1991 | Wood |
| 5,592,358 A | 1/1997 | Shamouilian et al. |

(Continued)

FOREIGN PATENT DOCUMENTS

| | | |
|---|---|---|
| CN | 101025893 | 8/2007 |
| CN | 101329837 | 12/2008 |

(Continued)

OTHER PUBLICATIONS

PCT International Search Report and Written Opinion for International Application No. PCT/US2013/063929, mailed Jan. 28, 2014, 16 pages.

(Continued)

*Primary Examiner* — Nicholas Lee
*Assistant Examiner* — Duane N Taylor, Jr.
(74) *Attorney, Agent, or Firm* — Blakely, Sokoloff, Taylor & Zafman LLP (57) ABSTRACT

A content-based adaptive refresh technique is implemented in an active matrix display system for reducing power consumption. The active matrix display system includes a display panel having multiple rows of display elements arranged as a display matrix. The display panel is coupled to a scan driver and a data driver. The scan driver selects one row at a time to receive data signals, and the data driver provides the data signals. The active matrix display system also includes a timing controller operable to signal the scan driver to cause a first row of the display panel to be not refreshed in a current data frame and a second row of the display panel to be refreshed in the current data frame.

28 Claims, 6 Drawing Sheets

(56) References Cited

U.S. PATENT DOCUMENTS

| | | | |
|---|---|---|---|
| 5,839,187 A | 11/1998 | Sato et al. | |
| 5,851,664 A | 12/1998 | Bennett et al. | |
| 5,888,847 A | 3/1999 | Rostoker et al. | |
| 5,903,428 A | 5/1999 | Grimard et al. | |
| 5,996,218 A | 12/1999 | Shamouilian et al. | |
| 6,071,795 A | 6/2000 | Cheung et al. | |
| 6,335,263 B1 | 1/2002 | Cheung et al. | |
| 6,403,985 B1 | 6/2002 | Fan et al. | |
| 6,420,242 B1 | 7/2002 | Cheung et al. | |
| 6,521,511 B1 | 2/2003 | Inoue et al. | |
| 6,558,109 B2 | 5/2003 | Gibbel | |
| 6,613,610 B2 | 9/2003 | Iwafuchi et al. | |
| 6,629,553 B2 | 10/2003 | Odashima et al. | |
| 6,670,038 B2 | 12/2003 | Sun et al. | |
| 6,786,390 B2 | 9/2004 | Yang et al. | |
| 6,788,109 B2 | 9/2004 | Kitagawa | |
| 6,878,607 B2 | 4/2005 | Inoue et al. | |
| 6,897,855 B1 * | 5/2005 | Matthies | G02F 1/13336 257/E25.032 |
| 7,015,825 B2 | 3/2006 | Callahan | |
| 7,033,842 B2 | 4/2006 | Haji et al. | |
| 7,079,205 B2 | 7/2006 | Kuji | |
| 7,148,127 B2 | 12/2006 | Oohata et al. | |
| 7,208,337 B2 | 4/2007 | Eisert et al. | |
| 7,353,596 B2 | 4/2008 | Shida et al. | |
| 7,358,158 B2 | 4/2008 | Aihara et al. | |
| 7,499,043 B2 * | 3/2009 | Vasqnez et al. | 345/212 |
| 7,585,703 B2 | 9/2009 | Matsumura et al. | |
| 7,622,367 B1 | 11/2009 | Nuzzo et al. | |
| 7,723,764 B2 | 5/2010 | Oohata et al. | |
| 7,795,629 B2 | 9/2010 | Watanabe et al. | |
| 7,797,820 B2 | 9/2010 | Shida et al. | |
| 7,838,410 B2 | 11/2010 | Hirao et al. | |
| 7,854,365 B2 | 12/2010 | Li et al. | |
| 7,880,184 B2 | 2/2011 | Iwafuchi et al. | |
| 7,884,543 B2 | 2/2011 | Doi | |
| 7,888,690 B2 | 2/2011 | Iwafuchi et al. | |
| 7,906,787 B2 | 3/2011 | Kang | |
| 7,910,945 B2 | 3/2011 | Donofrio et al. | |
| 7,927,976 B2 | 4/2011 | Menard | |
| 7,928,465 B2 | 4/2011 | Lee et al. | |
| 7,972,875 B2 | 7/2011 | Rogers et al. | |
| 7,982,296 B2 | 7/2011 | Nuzzo et al. | |
| 7,989,266 B2 | 8/2011 | Borthakur et al. | |
| 7,999,454 B2 | 8/2011 | Winters et al. | |
| 8,023,248 B2 | 9/2011 | Yonekura et al. | |
| 8,328,405 B2 | 12/2012 | Negley | |
| 8,333,860 B1 | 12/2012 | Bibl et al. | |
| 8,349,116 B1 | 1/2013 | Bibl et al. | |
| 8,378,781 B1 | 2/2013 | Peterson | |
| 8,395,312 B2 | 3/2013 | Hum | |
| 8,440,546 B2 | 5/2013 | Nuzzo et al. | |
| 8,506,867 B2 | 8/2013 | Menard | |
| 8,664,699 B2 | 3/2014 | Nuzzo et al. | |
| 8,680,889 B2 | 3/2014 | Leshniak | |
| 8,789,971 B2 | 7/2014 | Lo et al. | |
| 8,865,489 B2 | 10/2014 | Rogers et al. | |
| 8,877,648 B2 | 11/2014 | Bower et al. | |
| 8,889,485 B2 | 11/2014 | Bower | |
| 8,896,218 B2 | 11/2014 | Bora et al. | |
| 8,934,259 B2 | 1/2015 | Bower et al. | |
| 2001/0029088 A1 | 10/2001 | Odajima et al. | |
| 2002/0076848 A1 | 6/2002 | Spooner et al. | |
| 2002/0140685 A1 * | 10/2002 | Yamamoto | G09G 3/20 345/204 |
| 2003/0010975 A1 | 1/2003 | Gibb et al. | |
| 2003/0177633 A1 | 9/2003 | Haji et al. | |
| 2003/0197664 A1 | 10/2003 | Koyama | |
| 2004/0232439 A1 | 11/2004 | Gibb et al. | |
| 2005/0185113 A1 | 8/2005 | Weindorf et al. | |
| 2005/0232728 A1 | 10/2005 | Rice et al. | |
| 2006/0065905 A1 | 3/2006 | Eisert et al. | |
| 2006/0077127 A1 * | 4/2006 | Sampsell et al. | 345/55 |
| 2006/0157721 A1 | 7/2006 | Tran et al. | |
| 2006/0160276 A1 | 7/2006 | Brown et al. | |
| 2006/0214299 A1 | 9/2006 | Fairchild et al. | |
| 2007/0019129 A1 | 1/2007 | Negley | |
| 2007/0048902 A1 | 3/2007 | Hiatt et al. | |
| 2007/0166851 A1 | 7/2007 | Tran et al. | |
| 2007/0194330 A1 | 8/2007 | Ibbetson et al. | |
| 2008/0024481 A1 * | 1/2008 | Lee et al. | 345/212 |
| 2008/0100598 A1 * | 5/2008 | Juenger | 345/204 |
| 2008/0143728 A1 * | 6/2008 | Gorla et al. | 345/501 |
| 2008/0143729 A1 * | 6/2008 | Wyatt et al. | 345/501 |
| 2008/0163481 A1 | 7/2008 | Shida et al. | |
| 2008/0194054 A1 | 8/2008 | Lin et al. | |
| 2008/0196237 A1 | 8/2008 | Shinya et al. | |
| 2008/0252668 A1 * | 10/2008 | Chen | 345/690 |
| 2008/0283190 A1 | 11/2008 | Papworth et al. | |
| 2008/0303038 A1 | 12/2008 | Grotsch et al. | |
| 2009/0068774 A1 | 3/2009 | Slater et al. | |
| 2009/0146303 A1 | 6/2009 | Kwon | |
| 2009/0167644 A1 | 7/2009 | White et al. | |
| 2009/0303713 A1 | 12/2009 | Chang et al. | |
| 2009/0314991 A1 | 12/2009 | Cho et al. | |
| 2010/0105172 A1 | 4/2010 | Li et al. | |
| 2010/0188794 A1 | 7/2010 | Park et al. | |
| 2010/0203659 A1 | 8/2010 | Akaike et al. | |
| 2010/0203661 A1 | 8/2010 | Hodota | |
| 2010/0248484 A1 | 9/2010 | Bower et al. | |
| 2010/0276726 A1 | 11/2010 | Cho et al. | |
| 2010/0309100 A1 | 12/2010 | Cok et al. | |
| 2011/0003410 A1 | 1/2011 | Tsay et al. | |
| 2011/0049540 A1 | 3/2011 | Wang et al. | |
| 2011/0069096 A1 | 3/2011 | Li et al. | |
| 2011/0096106 A1 | 4/2011 | Nomaguchi et al. | |
| 2011/0151602 A1 | 6/2011 | Speier | |
| 2011/0159615 A1 | 6/2011 | Lai | |
| 2011/0210357 A1 | 9/2011 | Kaiser et al. | |
| 2012/0018494 A1 | 1/2012 | Jang et al. | |
| 2012/0064642 A1 | 3/2012 | Huang et al. | |
| 2012/0068600 A1 | 3/2012 | Hartmann et al. | |
| 2012/0092316 A1 | 4/2012 | He et al. | |
| 2012/0134065 A1 | 5/2012 | Furuya et al. | |
| 2012/0218318 A1 | 8/2012 | Hirao et al. | |
| 2012/0250323 A1 | 10/2012 | Velu | |
| 2013/0126081 A1 | 5/2013 | Hu et al. | |
| 2013/0126891 A1 | 5/2013 | Bibl et al. | |
| 2013/0285086 A1 | 10/2013 | Hu et al. | |
| 2014/0084240 A1 | 3/2014 | Hu et al. | |
| 2014/0132154 A1 | 5/2014 | Fried | |
| 2014/0175988 A1 | 6/2014 | Plourde et al. | |
| 2014/0373898 A1 | 12/2014 | Rogers et al. | |

FOREIGN PATENT DOCUMENTS

| | | |
|---|---|---|
| CN | 101730333 | 6/2010 |
| CN | 102239745 | 11/2011 |
| CN | 102338342 | 2/2012 |
| CN | 102346095 | 2/2012 |
| CN | 102356424 | 2/2012 |
| CN | 102395829 | 3/2012 |
| EP | 1694099 | 8/2006 |
| JP | 07-060675 A | 3/1995 |
| JP | 3406207 | 5/1999 |
| JP | 2001-298072 A | 10/2001 |
| JP | 2001-353682 A | 12/2001 |
| JP | 2002-134822 A | 5/2002 |
| JP | 2002-164695 A | 6/2002 |
| JP | 2002-176291 A | 6/2002 |
| JP | 2002-240943 A | 8/2002 |
| JP | 2004-095944 A | 3/2004 |
| JP | 2005-003696 | 1/2005 |
| JP | 2008-200821 | 9/2008 |
| JP | 2010-056458 A | 3/2010 |
| JP | 2010-186829 A | 8/2010 |
| JP | 2011-507032 | 3/2011 |
| KR | 10-0610632 B1 | 8/2006 |
| KR | 10-2007-0042214 A | 4/2007 |
| KR | 10-2007-0093091 A | 9/2007 |
| KR | 10-2008-0009921 A | 1/2008 |
| KR | 10-2008-0049515 | 5/2008 |
| KR | 10-0973928 B1 | 8/2010 |
| KR | 10-1001454 B1 | 12/2010 |

(56) References Cited

FOREIGN PATENT DOCUMENTS

| KR | 10-2007-0006885 A | 1/2011 |
|---|---|---|
| KR | 10-2011-0030780 | 3/2011 |
| KR | 10-2011-0084888 A | 7/2011 |
| KR | 10-2012-0010825 A | 2/2012 |
| KR | 10-2012-0067250 | 6/2012 |
| TW | 2008-22697 | 5/2008 |
| WO | WO-03/023745 | 3/2003 |
| WO | WO 2005-099310 A2 | 10/2005 |
| WO | WO-2011/123285 | 10/2011 |
| WO | WO 2011/123285 | 10/2011 |
| WO | WO-2012/044262 | 4/2012 |
| WO | WO-2012/108890 | 8/2012 |

OTHER PUBLICATIONS

"Characteristics of electrostatic Chuck(ESC)" Advanced Materials Research Group, New Technology Research Laboratory, 2000, pp. 51-53 accessed at http://www.socnb.com/report/ptech_e/2000p51_e.pdf.

Guerre, Roland, et al, "Selective Transfer Technology for Microdevice Distribution" Journal of Microelectromechanical Systems, vol. 17, No. 1, Feb. 2008, pp. 157-165.

Horwitz, Chris M., "Electrostatic Chucks: Frequently Asked Questions" Electrogrip, 2006, 10 pgs, accessed at www.electrogrip.com.

Hossick-Schott, Joachim, "Prospects for the ultimate energy density of oxide-based capacitor anodes" Proceedings of CARTS Europe, Barcelona, Spain, 2007, 10 pgs.

"Major Research Thrust: Epitaxial Layer Transfer by Laser Lift-off" Purdue University, Heterogeneous Integration Research Group, accessed at https://engineering.purdue.edu/HetInt/project_epitaxial_layer_transfer_llo.htm, last updated Aug. 2003.

Mei, Zequn, et al., "Low-Temperature Solders" Hewlett-Packard Journal, Article 10, Aug. 1996, pp. 1-10.

Miskys, Claudio R., et al., "Freestanding GaN-substrates and devices" phys. Stat. sol. © 0, No. 6, 2003, pp. 1627-1650.

"Principles of Electrostatic Chucks: 1—Techniques for High Performance Grip and Release" ElectroGrip, Principles1 rev3 May 2006, 2 pgs, accessed at www.electrogrip.com.

Steigerwald, Daniel, et al., "III-V Nitride Semiconductors for High-Performance Blue and Green Light-Emitting Devices" article appears in journal JOM 49 (9) 1997, pp. 18-23. Article accessed Nov. 2, 2011 at http://www.tms.org/pubs/journals/jom/9709/setigerwald-9709.html, 12 pgs.

Widas, Robert, "Electrostatic Substrate Clamping For Next Generation Semiconductor Devices" Apr. 21, 1999, 4 pgs.

PCT Notification Concerning Transmittal of International Preliminary Report on Patentability (Chapter I of the Patent Cooperation Treaty) for PCT Counterpart Application No. PCT/US2013/063929, Apr. 30, 2015, 13 pgs.

PCT International Preliminary Report on Patentability for PCT/US2013/074156 mailed Jul. 2, 2015.

Bower et al., "Transfer-Printed Integrated circuits for Display Backplanes," Semprius, Inc., ISSN-L 1883-2490/17/1203, 2010, pp. 1203-1206.

Bullis, Kevin, "Making Nanoelectronics for Displays," MIT Technology Review, Dec. 19, 2006.

"Semprious Named to MIT Technology Reviews 2013 50 Disruptive Companies List Recognizing World's Most Innovative Companies," Business Wire, Feb. 20, 2013, 3 pgs. Web. Jan. 13, 2014.

Wagner, et al., "The Semprius CPV Module Optics Performance," 3$^{rd}$ Workshop on Concentrating Photovoltaic Optics and Power, 2010, 26 pgs.

Asano, Kazutoshi, et al., "Fundamental Study of an Electrostatic Chuck for Silicon Wafer Handling" IEEE Transactions on Industry Applications, vol. 38, No. 3, May/Jun. 2002, pp. 840-845.

Bower, C.A., et al., "Active-Matrix OLED Display Backplanes Using Transfer-Printed Microscale Integrated Circuits", IEEE, 2010 Electronic Components and Technology Conference, pp. 1339-1343.

"Characteristics of electrostatic Chuck (ESC)" Advanced Materials Research Group, New Technology Research Laboratory, 2000, pp. 51-53.

Guerre, Roland, et al., "Selective Transfer Technology for Microdevice Distribution" Journal of Microelectromechanical Systems, vol. 17, No. 1, Feb. 2008, pp. 157-165.

Han, Min-Koo, "AM backplane for AMOLED" Proc. Of ASID '06, Oct. 8-12, New Delhi, pp. 53-58.

Harris, Jonathan H., "Sintered Aluminum Nitride Ceramics for High-Power Electronic Applications" Journal of the Minerals, Metals and Materials Society, vol. 50, No. 6, Jun. 1998, p. 56.

Horwitz, Chris M., "Electrostatic Chucks: Frequently Asked Questions" Electrogrip, 2006, 10pgs.

Hossick-Schott, Joachim, "Prospects for the ultimate energy density of oxide-based capacitor anodes" Medtronic Energy and Components Center, 10 pgs.

Lee, San Youl, et al., "Wafer-Level fabrication of GAN-based vertical light-emitting diodes using a multi-functional bonding material system" Semicond. Sci. Technol. 24, 2009, 4 pgs.

"Major Research Thrust: Epitaxial Layer Transfer by Laser Lift-off" Purdue University, Heterogeneous Integration Research Group.

Mei, Zequn, et al., "Low_Temperature Solders" Hewlett-Packard Journal, Article 10, Aug. 1996, pp. 1-10.

Mercado, Lei, L., et al., "A Mechanical Approach to Overcome RF MEMS Switch Stiction Problem" 2003 Electronic Components and Technology Conference, pp. 377-384.

Miskys, Claudio R., et al., "Freestanding GaN-substrates and devices" phys. Stat. sol., No. 6, 2003, pp. 1627-1650.

"Principles of Electrostatic Chucks: 1—Techniques for High Performance Grip and Release" ElectroGrip, Principles1, rev3 May 2006, 2 pgs.

Steigerwald, Daniel et al., "III-V Nitride Semiconductors for High-Performance Blue and Green Light-Emitting Devices" article appears in journal JOM 49(9) 1997, pp. 18-23.

Widas, Robert, "Electrostatic Substrate clamping For Next Generation Semiconductor Device" Apr. 21, 1999, 4 pgs.

"12-Bit High Bandwidth Multiplying DAC with Serial Interface: Data Sheet AD5452W," Rev. 0, Analog Devices, Inc., 2012, 24 pgs.

"Circuit Note CN-0139: Single Supply Low Noise LED Current Source Driver Using a Current Output DAC in the Reverse Mode" Rev. 0, Analog Devices, Inc., 2009, 2 pgs.

"LM3450: LM3450A LED Drivers with Active Power Factor Correction and Phase Dimming Decoder," Texas Instruments, Inc. SNVS681C, Nov. 2010—Revised Jun. 21, 2011, 37 pgs.

"Application Guide: Driving LEDs," found at www.micropowerdirect.com, Jun. 21, 2011 8 pgs.

Tsujimura, et al., "OLED Displays: Fundamentals and Applications" 4.3 Passive-Matrix OLED Display, pp. 91-109, 5.2 TFT Process, pp. 110-120, 7.2 OLED Lighting Requirement, pp. 191-196, 2012, John Wiley & Sons, Inc., Hoboken, New Jersey, USA.

PCT International Search Report and Written Opinion for International Application No. PCT/US2013/074156, mailed Mar. 31, 2014, 17 pages.

\* cited by examiner

CONTENT-BASED ADAPTIVE REFRESH SCHEMES FOR LOW-POWER DISPLAYS

BACKGROUND

Field

The present invention relates to a display system. More particularly, embodiments of the present invention relate to reducing the power consumption of a display panel.

Background Information

Flat panel displays are gaining popularity in a wide range of electronic devices. Common types of flat panel displays include active matrix displays and passive matrix displays. Each pixel in an active matrix display is driven by active driving circuitry, while each pixel in a passive matrix display does not use such driving circuitry.

High-resolution color displays, such as modern computer displays, smart phones and televisions, typically use an active matrix display structure for better image quality and response time. An active matrix display of m×n pixel elements can be addressed with m row lines and n column lines. A set of thin-film transistors (TFTs) and capacitors are connected to each pixel element, allowing each column line to access one pixel. When a row line is selected, all of the column lines are connected to a row of pixels and voltages corresponding to the picture information are driven onto all of the column lines. The row line is then deactivated and the next row line is selected. All of the row lines are selected in sequence during a refresh operation. This refresh operation is repeated tens to hundreds of times per second. If the refresh rate is too low, the capacitors may leak current and unable to retain its state. This would appear as flickers and degrade the quality of the displayed image.

For portable devices, the power consumed by a display panel can be a major portion of the total power consumption of a portable device. To extend the battery life, it is necessary to reduce the power consumption of the display panel.

SUMMARY OF THE INVENTION

A method, system and apparatus for content-based adaptive refresh of a low-power display panel are described. In one embodiment, an active matrix display system includes a display panel having multiple rows of display elements arranged as a display matrix. The display panel is coupled to a scan driver and a data driver. The scan driver selects one row at a time to receive data signals, and the data driver provides the data signals. The active matrix display system also includes a timing controller operable to signal the scan driver to cause a first row of the display panel to be not refreshed in a current data frame and a second row of the display panel to be refreshed in the current data frame. In one embodiment, the active matrix display system also includes refresh logic operable to compare content of the first row in the current data frame with content of the first row in a previous data frame, and to determine whether the first row is to be refreshed in the current data frame based on a result of the comparison. Thus, the rows that display a dynamic content can be refreshed at a higher refresh rate than the rows that display a static content.

In another embodiment, a method for refreshing a display panel includes refreshing a first portion of the display panel at a first refresh rate, wherein the first portion displays a static content; and refreshing a second portion of the display panel at a second refresh rate higher than the first refresh rate, wherein the second portion displays a dynamic content. In one embodiment, the method further includes comparing content of the first portion of a current data frame with content of the first portion of a previous data frame to generate a comparison result, and determining whether the first portion displays a static content based on the comparison result. A portion of the display panel is refreshed when the portion of the display panel has a content change beyond a threshold or has reached a time out threshold.

In yet another embodiment, an apparatus includes a frame buffer to store a first portion of a previous data frame and a corresponding first portion of a current data frame, and refresh logic operable to compare content of the first portion of the current data frame with content of the corresponding first portion of the previous data frame to generate a comparison result, and to determine whether to refresh the first portion of the current data frame based on the comparison result. The refresh logic and the frame buffer may be located within a display system, a processor (such as a graphics processing unit (GPU) or a general purpose processing having graphics processing capabilities), an interface module coupled between the display system and the processor, or one or more hardware components coupled to a timing controller. The refresh logic is operable to assign different refresh rates to different portions of a display panel.

In one embodiment, the display panel of the above system, method and apparatus includes light emitting diode (LED) devices, micro LED devices, organic LED (OLED) devices, or liquid crystal display (LCD) elements. The term "portion" as used herein may be a row, a set of rows, a tile, a set of tiles, or a set of LED devices within a tile.

BRIEF DESCRIPTION OF THE DRAWINGS

Embodiments are illustrated by way of example and not limitation in the Figures of the accompanying drawings.

DETAILED DESCRIPTION OF THE INVENTION

In various embodiments, description is made with reference to figures. However, certain embodiments may be practiced without one or more of these specific details, or in combination with other known methods and configurations. In the following description, numerous specific details are set forth, such as specific configurations, dimensions and processes, etc., in order to provide a thorough understanding of the present invention. In other instances, well-known techniques and components have not been described in particular detail in order to not unnecessarily obscure the present invention. Reference throughout this specification to "one embodiment," "an embodiment" or the like means that a particular feature, structure, configuration, or characteristic described in connection with the embodiment is included in at least one embodiment of the invention. Thus, the appearances of the phrase "in one embodiment," "in an embodiment" or the like in various places throughout this specification are not necessarily referring to the same embodiment of the invention. Furthermore, the particular features, structures, configurations, or characteristics may be combined in any suitable manner in one or more embodiments.

Embodiments of the present invention provide a method and system for reducing the power consumption of an active matrix display panel. For example, a major percentage of power consumed by an active matrix liquid crystal display (LCD) or organic LEDs (OLEDs) display panel is used on refreshing the display data to overcome panel parasitics that arise from switching transistors, storage capacitors, and row and column interconnects. In current display technologies the display data is typically refreshed at least 60 times per second (60 Hz) to avoid flickering in the displayed image, and power consumption required for display emission is as much as 5 to 10 times higher the amount of power consumption required for refreshing the display data. For example, for high resolution 10-inch diagonal displays, the power consumption for display emission may be 5-10 watts and the power consumption for refreshing the display data may be 1 watt. Accordingly, less emphasis has been placed on reducing power consumption during a refresh cycle than for reducing power consumption required for display emission.

In accordance with some embodiments of the invention, the active matrix display panel described herein is a micro LED display panel formed by micro LED devices. A micro LED display panel combines the performance, efficiency, and reliability of wafer-based LED devices with the high yield, low cost, mixed materials of thin film electronics used to form backplanes. The term "micro" in "micro LED device" refers to the scale of 1 to 100 µm. However, it is to be appreciated that the embodiments described herein may be applicable to larger, and possibly smaller size scales. In an embodiment, a display panel is similar to atypical OLED display panel, with a micro LED device having replaced the organic layer of the OLED display panel in each subpixel. Exemplary micro LED devices which may be utilized with some embodiments of the invention are described in U.S. patent application Ser. Nos. 13/372,222, 13/436,260, 13/458,932, and 13/625,825, all of which are incorporated herein by reference. The micro LED devices are highly efficient at light emission and consume very little power (e.g., 250 mW) compared to 5-10 watts for LCD or OLED emission. Assuming, that the power consumption required for refreshing the display data remains the same (e.g. 1 watt), the percentage of power required for a refresh cycle to total power consumption for a micro LED display panel is more significant. Embodiments of the invention provide content-based adaptive refresh schemes for reducing the power consumption on display refresh. It should be appreciated, however, the adaptive refresh schemes are applicable to any active matrix displays, including but not limited to an LED display panel, a micro LED display panel, an OLED display panel, an LCD display panel, and other variations of display panels based on LED, OLED and LCD technologies.

One technique for reducing the refresh power consumption is to reduce the refresh rate of the display panel. With improved circuit elements, such as larger storage capacitors and switching transistors with lower OFF state leakage current, a display system may reduce its refresh rates without degrading the image quality beyond a predetermined design limit. Embodiments of the present invention provide a content-based adaptive refresh technique to reduce power consumption of a display system, which can be implemented in combination with or separately from the use of improved circuit elements. The content-based adaptive refresh technique refreshes different parts of a display panel at different rates based on data contents. A row of data that does not change its content, or changes less often than the other rows, is refreshed less often than these other rows. The refresh rate can be adjusted in real time during the data display process. When a row of data changes its content from static content (e.g., text or still image) to dynamic content (e.g., video), the refresh rate of that row can be increased to improve the image quality. When a row of data changes its content from dynamic content to static content, the refresh rate of that row can be decreased to reduce power consumption. That is, different rows of a display panel can be refreshed at different rates depending on their respective display contents.

As used herein, the term "data frame" refers to the display data that fills the entire display area of a display panel. Each row of a data frame is referred to as a "data line." The term "frame time" or "frame cycle" refers to the time for selecting and displaying all of the rows in a data frame. The term "line time" or "line cycle" refers to the time for selecting and displaying one of the rows in a data frame. Further, the terms "display panel" and "display" are used interchangeably.

Moreover, the term "ON" as used herein in connection with a device state refers to an activated state of the device, and the term "OFF" used in this connection refers to a de-activated state of the device. The term "ON" as used herein in connection with a signal received by a device refers to a signal that activates the device, and the term "OFF" used in this connection refers to a signal that de-activates the device. A device may be activated by a high voltage or a low voltage, depending on the underlying electronics implementing the device. For example, a PMOS transistor device is activated by a low voltage while a NMOS transistor device is activated by a high voltage. Thus, it should be understood that an "ON" voltage for a PMOS transistor device and a NMOS transistor device correspond to opposite (low vs. high) voltage levels.

Figure 1:
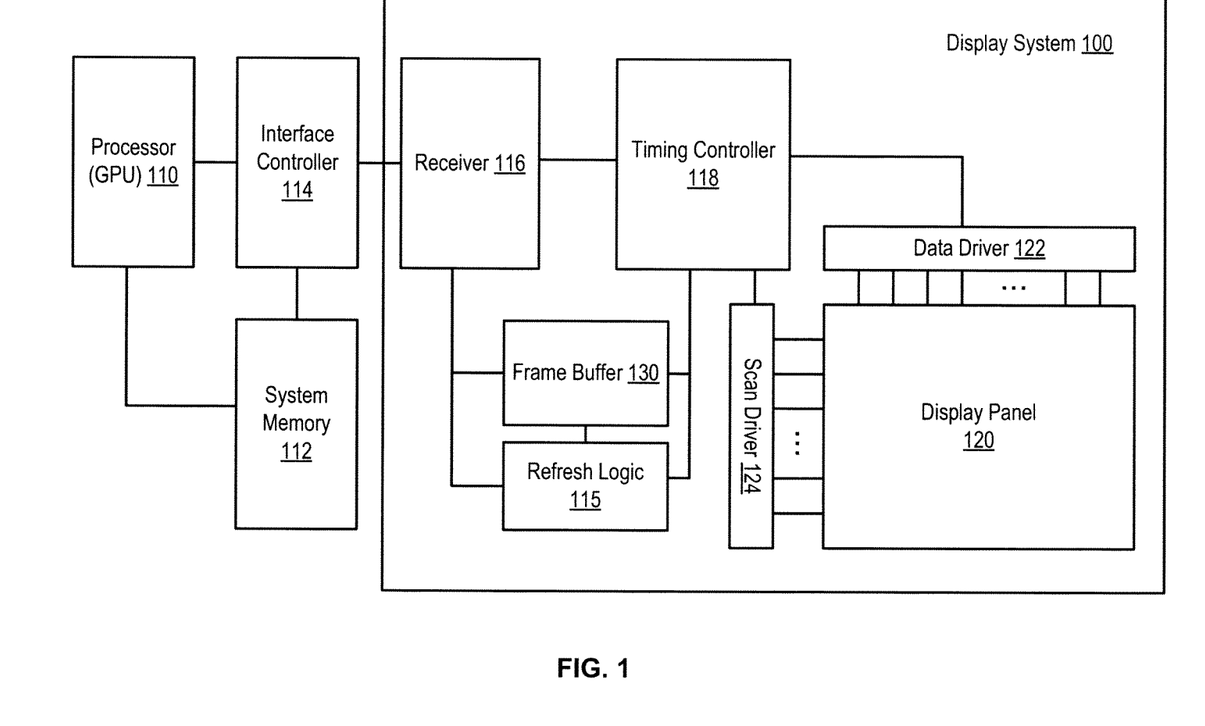
FIG. 1 is a block diagram of a display system according to one embodiment.

FIG. 1 illustrates a display system 100 in accordance with an embodiment. The display system 100 includes a display panel 120 driven by display driver integrated circuitry, which includes a data driver 122 and a scan driver 124. The scan driver 124 selects a row of the display panel 120 at a time by providing an ON voltage to the selected row. The selected row is activated to receive display data from the data driver 122.

The display panel 120 is an active matrix display that includes a two-dimensional matrix of display elements. In some embodiments, the display panel 120 may include multiple stacked layers of two-dimensional matrix of display elements. In one embodiment, each display element is an emissive device, which, for example, may include LEDs, OLEDs, micro LEDs, or other light-emissive elements. However, it is to be appreciated that embodiments of the present invention are not necessarily so limited. In alternative embodiments, each display element may be an LCD element, or other types of display elements.

The display panel 120 includes a matrix of pixels. Each pixel may include multiple subpixels that emit different colors of lights. In a red-green-blue (RGB) subpixel arrangement, each pixel includes three subpixels that emit red, green and blue lights, respectively. It is to be appreciated that the RGB arrangement is exemplary and that embodiments are not so limited. Examples of other subpixel arrangements that can be utilized include, but are not limited to, red-green-blue-yellow (RGBY), red-green-blue-yellow-cyan (RGBYC), or red-green-blue-white (RGBW), or other subpixel matrix schemes where the pixels may have different number of subpixels, such as the displays manufactured under the trademark name PenTile®.

In one embodiment, the data driver 122 and the scan driver 124 are controlled by a timing controller 118. The timing controller 118 provides the scan driver 124 a select signal indicating which row is to be selected next for refresh. The timing controller 118 also presents a data line to the data driver 122 in the form of a row of data voltages. Each data voltage drives a corresponding subpixel in the selected row to emit a colored light at a specified intensity level. The rows may be refreshed sequentially. Alternatively, the rows may be addressed directly and refreshed one at a time in any given order. In yet another embodiment, the rows are partitioned into several non-overlapping (or overlapping) row segments. Each row segment can be addressed directly and the rows within a segment can be refreshed sequentially or in any given order. The illustrated embodiment shows that the timing controller 118, the data driver 122 and the scan driver 124 as separate components. In an alternative embodiment, the timing controller 118 and the data driver 122 may be one integrated component. In yet another embodiment, the timing controller 118, the data driver 122 and the scan driver 124 may be one integrated component.

The display system 100 includes a receiver 116 to receive display data from outside of the display system 100. The receiver 116 may be configured to receive data wirelessly, by a wire connection, or by an optical interconnect. Wireless may be implemented in any of a number of wireless standards or protocols including, but not limited to, Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond.

The receiver 116 may receive display data from a processor 110 via an interface controller 114. In one embodiment, the processor 110 may be a graphics processing unit (GPU), a general-purpose processor having a GPU located therein, or a general-purpose processor with graphics processing capabilities. The interface controller 114 provides display data and synchronization signals to the receiver 116, which in turn provides the display data to the timing controller 118. The display data may be generated in real time by the processor 110 executing one or more instructions in a software program, or retrieved from a system memory 112.

Depending on its applications, the display system 100 may include other components. These other components include, but are not limited to, memory, a touch-screen controller, and a battery. In various implementations, the display system 100 may be a television, tablet, phone, laptop, computer monitor, automotive heads-up display, automotive navigation display, kiosk, digital camera, handheld game console, media display, ebook display, or large area signage display.

According to one embodiment of the invention, the display system 100 also includes a refresh logic 115 and a frame buffer 130. The refresh logic 115 determines which rows should be refreshed and which rows should be skipped. Thus, the refresh logic 115 is responsible for refreshing different rows of the display panel 120 at different refresh rates based on the data content of the rows. The refresh logic 115 may base its decision on the data content stored in the frame buffer 130 and/or the mode in which the display panel 120 operates.

In the illustrated embodiment, the refresh logic 115 and the frame buffer 130 are located in the display system 100 and are couple to the timing controller 118. In an alternative embodiment, the refresh logic 115 and the frame buffer 130 may be located within the timing controller 118, the receiver 116, the interface controller 114, the processor 110, or another component within or coupled to the display system 100. The refresh logic 115 may be implemented by hardware circuitry (such as integrated circuitry) or firmware components. The frame buffer 130 may be a memory device, such as a dynamic random access memory (DRAM), or other types of volatile or non-volatile random access memory devices.

The refresh logic 115 determines which rows to refresh and when to refresh the rows. In one embodiment, the refresh logic 115 compares a data line of a current data frame with the corresponding data line of a previous data frame to determine whether or not this data line should be refreshed. The data lines used for the comparison are stored in the frame buffer 130. A number of alternative approaches for performing the comparison are described below; however, it is to be appreciated that the described approaches are exemplary and that embodiments are not so limited.

For example, the frame buffer 130 may store a previous data frame and one current data line to be displayed. If this current data line is the same as or within a predefined variation from the corresponding data line of the previous data frame, no refresh will be performed on the data line (unless the data line is going to be timed out, as will be described below). If the current data line is different or exceed a predefined variation from the corresponding data line of the previous data frame, the refresh logic 115 will signal the downstream component (i.e., a hardware component between the refresh logic 115 and the display panel 120) to cause the data line to be refreshed. The downstream component may send acknowledgements to the refresh logic 115 or other upstream components (i.e., components between the processor 110 and the downstream component). The current data line can then overwrite the corresponding data line of the previous data frame in the frame buffer 130, and a next data line can be loaded into the frame buffer 130 for comparison. As another example, the frame buffer 130 may store the previous data frame and a current segment (which is a set of rows) to be displayed. The refresh logic 115 may compare the current segment with a corresponding segment of the previous data frame to determine whether the segment or any of the data lines in the segment needs to be refreshed. In one embodiment, after comparing a line/segment, the line/segment may overwrite the corresponding line/segment in the previous data frame.

As yet another example, the frame buffer 130 may store the previous data frame and an entire current data frame to be displayed. The refresh logic 115 may compare the corresponding data lines in the two frames line by line, or segment by segment, to identify the data lines or segments that need to be refreshed. In one embodiment, after comparing a line/segment, the line/segment in the current data frame may overwrite the corresponding line/segment in the previous data frame. Alternatively, after comparing the two frames, the current data frame is set to the "new" previous data frame and a next data frame can be loaded into the frame buffer 130 as the "new" current data frame. In addition or alternative to the comparison described above, the refresh logic 115 may determine whether to refresh a data line based on the operation mode of the display panel 120. In one embodiment, the refresh logic 115 may receive signals from the processor 110 or another source indicating a current display mode of the display panel 120, such as a static mode (e.g., when displaying still images, texts or e-books), a dynamic mode (e.g., when displaying videos), a mixed mode (e.g., when displaying mixed text and video contents). For the mixed mode display, the refresh logic 115 may receive signals from the processor 110 or another source indicating the coordinates or row indices of the region or regions that need a different refresh rate from the rest of the display. For example, an online news page may display text, with a small window showing a video. The coordinates of the window, or the row indices of the window, may be sent to the refresh logic 115 such that the refresh logic 115 may pass this information to the downstream component to selectively refresh the data lines.

According to embodiments of the invention, a data line is refreshed when its data content has changed beyond a threshold. Additionally, a data line is refreshed when its content is going to be timed out. Otherwise the data line does not need to be refreshed. The content of a data line is timed out when the elapsed time from its last refresh has reached a threshold. This threshold is the maximum amount of time that a display element (e.g., a subpixel) can hold its electric charge in the storage capacitor without causing a change to the display image that exceeds a predetermined design limit. The refresh logic 115 may keep one or more timers to track the elapsed time from the last refresh for the rows; e.g., one timer for each data line or each segment. When the elapsed time reaches the threshold, the refresh logic 115 signals the downstream component to refresh the data line/segment, even if the data line/segment has no content change.

As described above, one approach to reducing power consumption on data refresh is by selectively lowering the refresh rates, such as skipping a data line/segment during data refresh. In addition, the data transfer rate into the display panel 120 can be reduced to realized further power saving. As described above, the refresh logic 115 may be located in the display system 100 or outside the display system 100. For example, the refresh logic 115 may be located within any of the following components: the timing controller 118, the receiver 116, the interface controller 114, the processor 110, or coupled to any of the above components. The location of the refresh logic 115 and the signal it sends to its downstream component can affect the data transfer rate along the data path into the display panel 120. In one embodiment, the refresh logic 115 is located within the processor 110. If the processor 110 only outputs the line/segment content that needs to be refreshed, the data transfer rate along the entire path from the processor 110 to the display panel 120 can be reduced. Alternatively, the processor 110 may output all of the line/segment content regardless whether a refresh is needed, and for each line/segment the processor 110 also outputs an indicator (e.g., an activate/ignore signal) indicating whether that line/segment needs to be refreshed. If the entire data content is forwarded all the way to the data driver 122, which selectively refreshes the line/segment according to the indicator, then no reduction in the data transfer rate can be realized along the path from the processor 110 to the display panel 120. If the data content is forwarded to a component downstream from the processor 110 before reaching the display panel 120 (e.g., the timing controller 118 or the interface component 114), at which point only the data lines that need refresh is forwarded to the display panel 120, then the data transfer rate can be reduced along the path from this component to the display panel 120.

In an embodiment where the refresh logic 115 is within the timing controller 118 or is coupled to the timing controller 118 as shown in the illustrated embodiment of FIG. 1, the data transfer rate along the path from the timing controller 118 to the display panel 120 can be reduced if the timing controller 118 only sends the data lines that need refresh to the display panel 120. If the timing controller 118 sends all of the data lines to the data driver 122, it may also send an "ignore" signal for the line/segment that is not to be refreshed and an "activate" signal for the line/segment that is to be refreshed. However, this latter approach only reduces the display refresh power and does not reduce the data transfer rate on the path to the display panel 120. Alternative scenarios may exist for the location of the refresh logic 115 and the component that starts the reduction in data transfer rate. It is to be appreciated that the above described scenarios are exemplary and that embodiments are not so limited.

Figure 2:
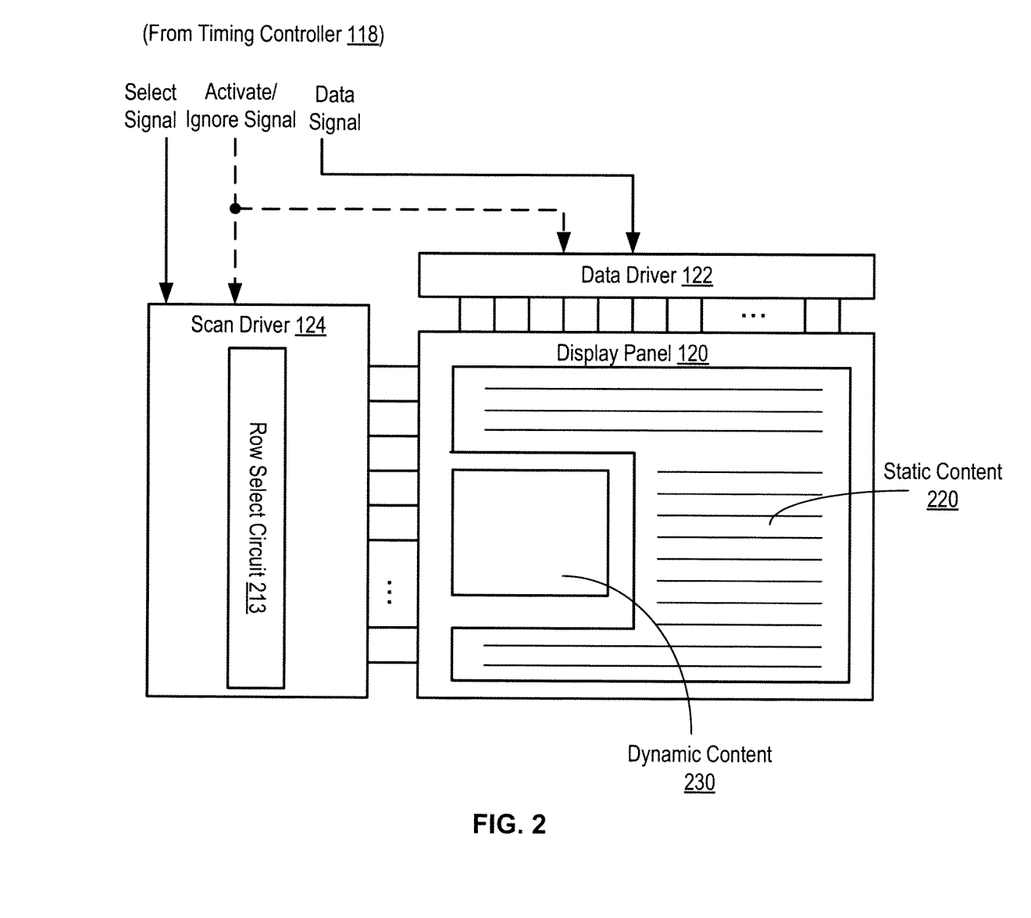
FIG. 2 is a block diagram of a display panel and display driver circuitry according to one embodiment.

FIG. 2 illustrates an example of the content-based adaptive refresh in further detail according to one embodiment of the invention. In this example, the display panel 120 is in a mixed display mode, in which a dynamic content 230 such as video is shown in a window while the rest of the display shows a static content 220 such as a page of text. The timing controller 118 of FIG. 1 sends a select signal to the scan driver 124 indicating a next row to be displayed, and sends a data signal to the data driver 122 containing the data line to be displayed. The select signal may specify a row index to directly address a row in the display panel 120 for refresh, or may prompt the scan driver 124 to select the next row in the sequential order. In an alternative embodiment, the timing controller 118 may also send an "activate/ignore" signal indicating whether the data signal presented to the data driver 122 is to be loaded into the display panel 120. In this alternative embodiment, the activate/ignore signal may be sent to the scan driver 124 alone, or to both the scan driver 124 and the data driver 122.

To select a row for refresh, the scan driver 124 may use a row select circuit 213 as shown in the illustrated embodiment. The row select circuit 213 may be a demultiplexer, which, based on an input row index, outputs an ON voltage to directly select one of the rows of the display panel 120. The row that is turned on is refreshed with the data line from the data driver 122. Alternatively, the row select circuit 213 may include a shift register. The shift register may contain at least the same number of bits as the number of rows in the display panel 120. The shift register may include one shift token of a bit value of one, and the rest of the bits in the shift register are zeros. It is understood that the bit values of one and zero are exemplary and may be reversed in certain embodiments. In this alternative embodiment, the select signal from the timing controller 118 prompts the shift register to shift the token to a next row in the sequential order to thereby sequentially select a row at a time. A high-definition (HD) display panel typically has thousands of rows and thousands of columns. A single shift register may not have enough number of bits for the entire row dimension. In one embodiment, the scan driver 124 may include multiple shift registers (e.g., S1, S2, S3, . . . , Sn), each for selecting one of the row segments (i.e., a subset of rows) in the display panel 120. The shift registers may be coupled to a demultiplexer, which directly selects one of the shift registers at a time. It is appreciated that other known hardware implementations for row selection may also be used and the arrangement described above is exemplary and not limiting.

In the example of FIG. 2, the scan driver 124 can refresh the rows at a higher rate for the dynamic content 230 and a lower rate for the static content 220. The scan driver 124 may directly select the rows of the dynamic content 230, directly select the segments that contain the dynamic content 230, sequentially clock through the rows until upper boundary of the dynamic content is reached, or otherwise select the dynamic content 230 by a combination of direct and sequential selection schemes using the row select circuit 213 as described above. In other scenarios where a row has changed content or reached a time out threshold, the scan driver 124 may select that row for refresh directly or by sequential selection using row select circuit 213 as described above.

FIG. 3A, FIG. 3B, FIG. 4A, FIG. 4B and FIG. 5 illustrate examples of timing diagrams of the content-based adaptive refresh according to embodiments of the invention. In these examples, it is assumed that the display panel has 1080 rows, and the default frame cycle is 16.67 ms, which corresponds to a default refresh rate of 60 Hz. It is to be appreciated that these numbers are chosen for illustration purposes; alternative embodiments may have different default frame cycles and default refresh rates. Each of the timing diagrams may be generated by the system, components and signals shown in FIG. 1 and FIG. 2. Row selection may be made using a demultiplexer and/or one or more shift registers, as described above with reference to the row select circuit 213.

Figure 3A:
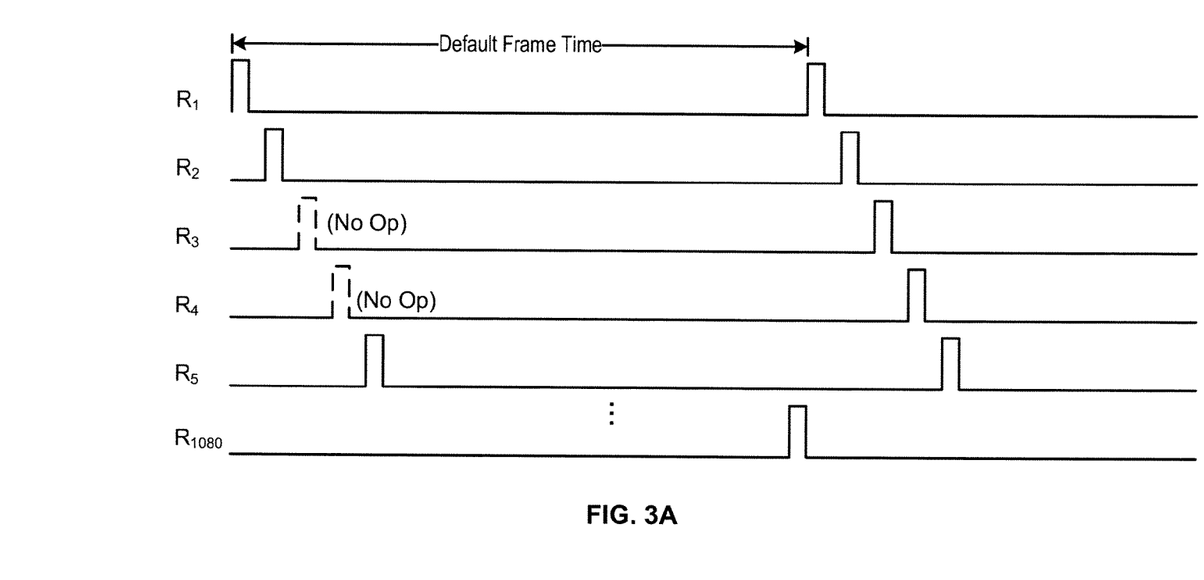
FIG. 3A and FIG. 3B are timing diagrams illustrating one example of refresh operations according to one embodiment.
Figure 3B:
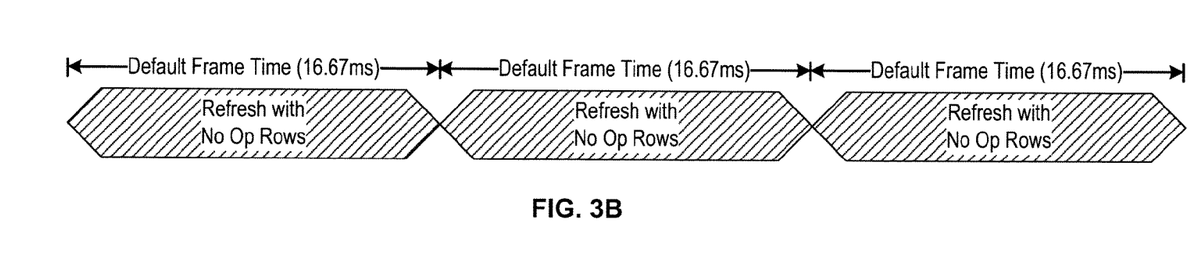

In the example of FIG. 3A and FIG. 3B, it is assumed that rows $R_3$ and $R_4$ have no content change and have not reached a time out threshold in the current data frame that is to be displayed. As a result, no operations are performed in the line cycles of $R_3$ and $R_4$ (shown in dotted lines). That is, the line cycles of $R_3$ and $R_4$ are idle as $R_3$ and $R_4$ are not selected in these cycles for receiving data signals. FIG. 3B shows that the corresponding frame time stays the same from one frame cycle to the next. However, not all the rows are refreshed in every frame cycle. Thus, even though the default refresh rate is 60 Hz, not all of the rows are refreshed 60 times per second. The rows that do not have content change or have slow content changes can be refreshed at a slower rate, such as 40 Hz, 30 Hz or even less, depending on the electric properties of other circuit components in the display panel. The reduction in the refresh rate for a subset of the rows in the display panel can reduce power consumption of the display panel.

Figure 4A:
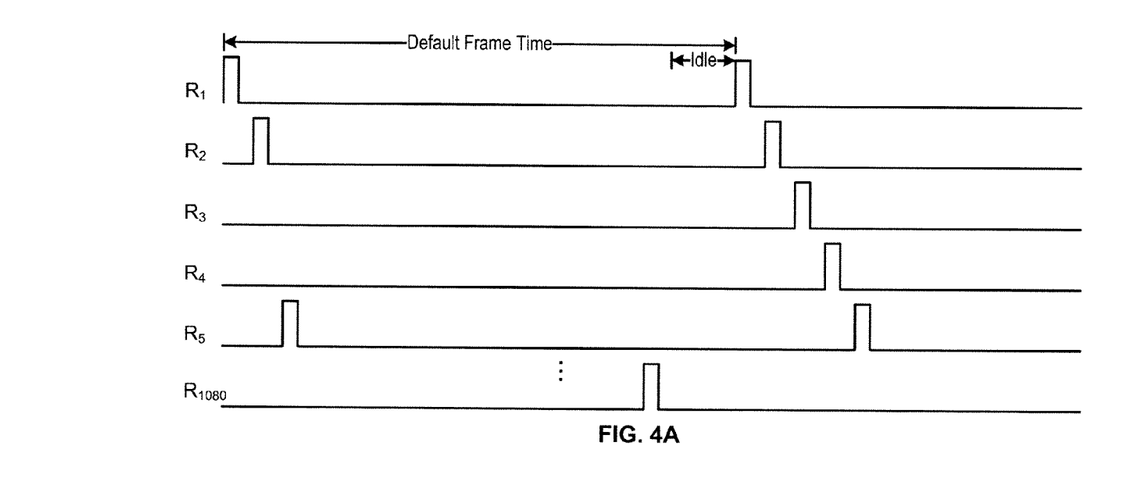
FIG. 4A and FIG. 4B are timing diagrams illustrating another example of refresh operations according to one embodiment.
Figure 4B:
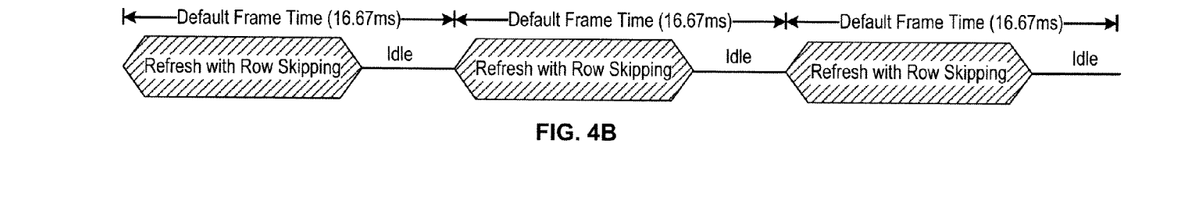
Figure 5:
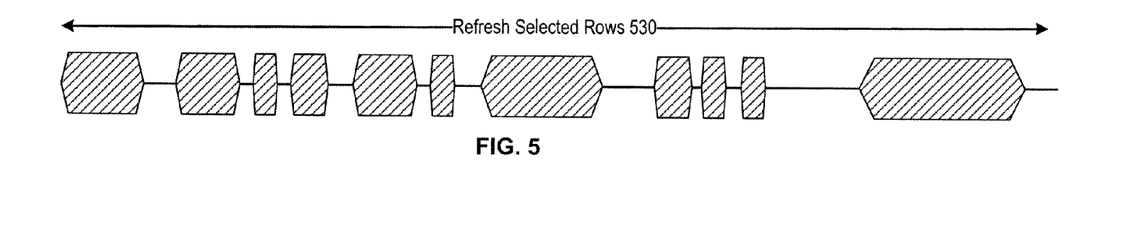
FIG. 5 is a timing diagram illustrating yet another example of refresh operations according to one embodiment.

In the example of FIG. 4A and FIG. 4B, it is also assumed that rows $R_3$ and $R_4$ have no content change and have not reached a time out threshold. Thus, $R_3$ and $R_4$ are skipped from being refreshed for the current frame cycle. Instead of being idle in the line cycles of $R_3$ and $R_4$, the scan driver 124 proceeds to select the next rows following $R_3$ and $R_4$. As shown in FIG. 4A, the line cycle that was scheduled for refreshing $R_3$ is now used for refreshing $R_5$, which is the next row following $R_3$ and $R_4$ that has a content change. FIG. 4B shows that the corresponding frame time stays the same from one frame cycle to the next. However, similar to the example of FIG. 3B, the entire data frame is not refreshed in every frame cycle. For example, in the frame cycles shown in FIG. 4B, each frame time includes an active refresh period in which rows (but not necessarily all of the rows in the display panel) are refreshed in each line cycle, and an idle period in which no refresh operation is performed. This idle period enables power saving. In the example of FIG. 5, a data line is refreshed whenever it has a content change or reached a time out threshold, without following a fixed schedule. The timing controller 118 dynamically schedules the refresh on demand. If none of the rows have content change or have reached the time out threshold, no refresh operations are performed (shown in FIG. 5 as horizontal lines indicating idle periods). If a data line reaches its time out threshold when another data line is up for refresh due to changed content, the timed out data line may be serviced before the other data line.

Although not shown in the figures, in alternative embodiments, the time out refresh may be performed at fixed intervals (e.g., every five frame cycles). Between the two time out refreshes, only the data lines having content change beyond a threshold are refreshed. As some data lines may not be refreshed at all between the two consecutive time out refreshes, the elapsed time between the two time out refreshes for each data line cannot be greater than the time out threshold.

Figure 6:
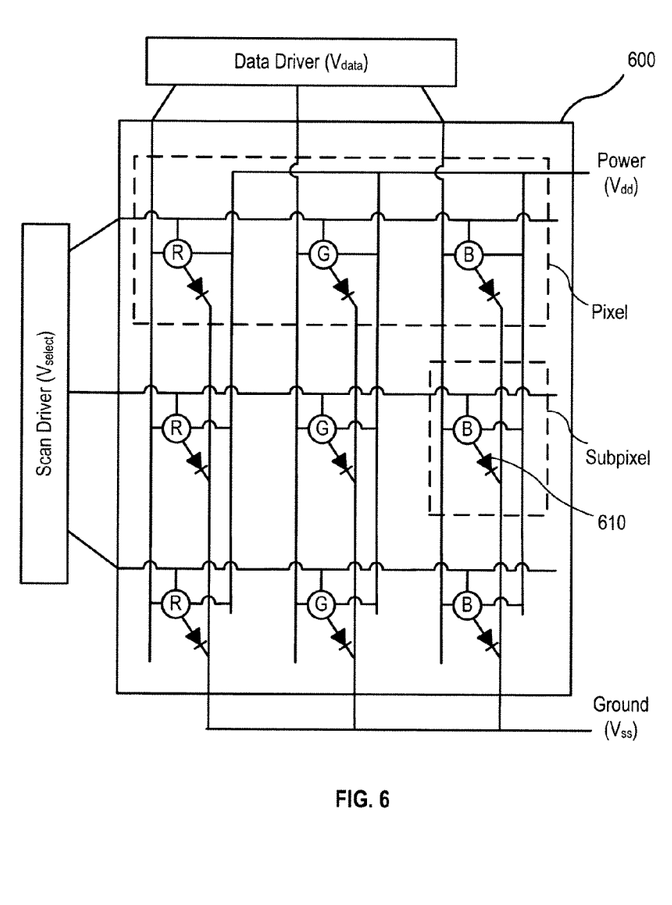
FIG. 6 is circuit diagram of an active matrix display according to one embodiment.

FIG. 6 is a circuit diagram of a pixel in an active matrix display 600 in accordance with an embodiment of the invention. The active matrix display 600 is meant to be one example of the display panel 120 shown in FIG. 1 and FIG. 2, and other types of active matrix displays are contemplated in accordance with embodiments of the invention. As illustrated, the scan lines $V_{select}$ are oriented horizontally and a driven by one or more scan drivers, and data lines $V_{data}$ are oriented vertically and are driven by one or more data drivers. In one embodiment, red, green, and blue light emitting micro LED devices 610 are placed between the scan lines and data lines. It is to be appreciated that in alternative embodiments, the micro LED devices 610 may be an LED device or an OLED device, and the active matrix display 600 may be based on light emission devices such as LED, OLED and LCD devices.

Figure 7:
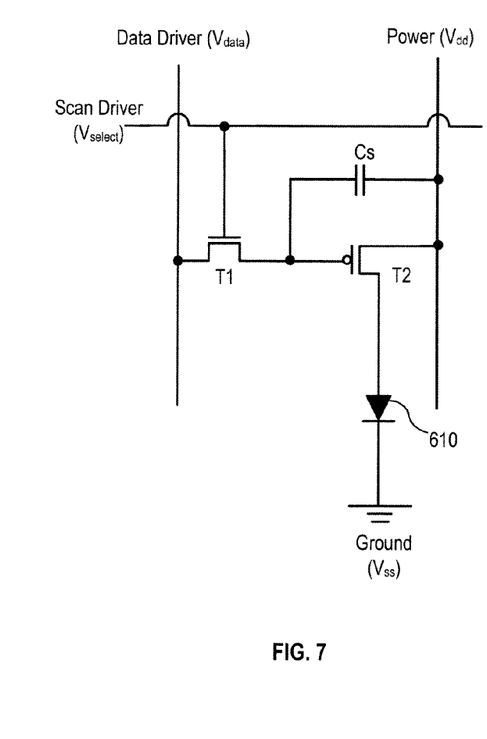
FIG. 7 is circuit diagram of a subpixel in an active matrix display according to one embodiment.

FIG. 7 is a circuit diagram of a subpixel with 2T1C circuitry in an active matrix display (e.g., the active matrix display 600 of FIG. 6) in accordance with an embodiment of the invention. In such an embodiment, the circuit includes a switching transistor T1, a driving transistor T2, a storage capacitor Cs and a micro LED device 610. The transistors T1, T2 can be any type of transistor such as a thin film transistor. For example, the switching transistor T1 can be an n-type metal-oxide semiconductor (NMOS) transistor, and the driving transistor T2 can be a p-type metal-oxide semiconductor (PMOS) transistor. The switching transistor T1 has a gate electrode connected to a scan line $V_{select}$ and a first source/drain electrode connected to a data line $V_{data}$. The driving transistor T2 has a gate electrode connected to a second source/drain electrode of the switching transistor T1 and a first source/drain electrode connected to a power source $V_{dd}$. The storage capacitor Cs is connected between the gate electrode of the driving transistor T2 and the first source/drain electrode of the driving transistor T2. Alternatively, instead of connecting to the first source/drain electrode of T2, Cs may be connected to its own ground line, the anode electrode of the LED device 610, a previous/next row of the scan line, or other alternative locations in the circuitry. The micro LED device 610 has an anode electrode connected to a second source/drain electrode of the driving transistor T2 and a cathode electrode connected to a ground $V_{ss}$. Alternatively, the micro LED device 610 may have the cathode electrode connected to the second source/drain electrode of T2 and the anode electrode connected to $V_{dd}$, where $V_{dd}$ in FIG. 7 is replaced by $V_{ss}$ in this alternative embodiment. It is to be appreciated that the embodiment of FIG. 7 is exemplary and alternative embodiments may exist.

In operation, a voltage level scan signal turns on the switching transistor T1, which enables the data signal to charge the storage capacitor Cs. The voltage potential that stores within the storage capacitor Cs determines the magnitude of the current flowing through the driving transistor T2, so that the micro LED device 610 can emit light based on the current. It is to be appreciated that the 2T1C circuitry is meant to be exemplary, and that other types of circuitry or modifications of the traditional 2T1C circuitry are contemplated in accordance with embodiments of the invention. For example, more complicated circuits can be used to compensate for variations in the electrical properties of the driver transistor and the micro LED device, or for their instabilities.

Figure 8:
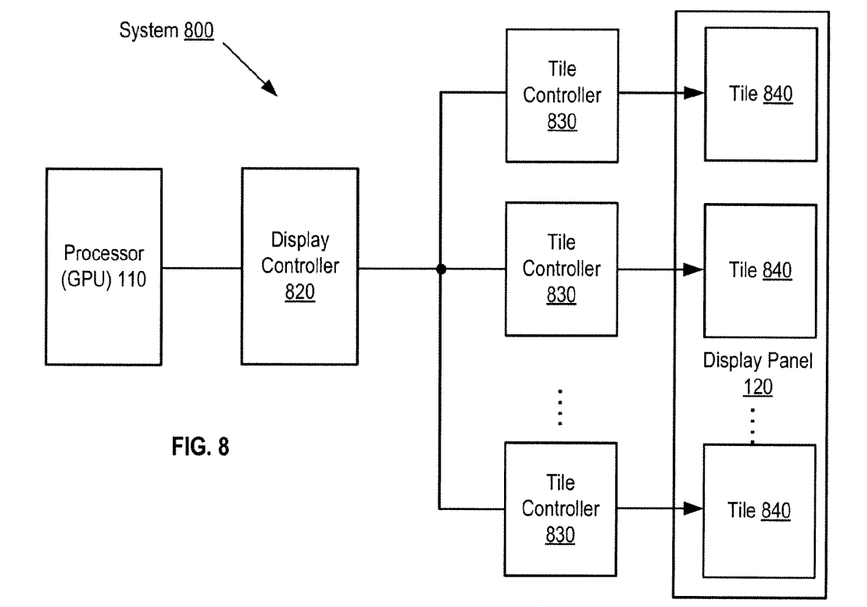
FIG. 8 illustrates an alternative embodiment of a system in which the adaptive refresh schemes may apply.
Figure 9A:
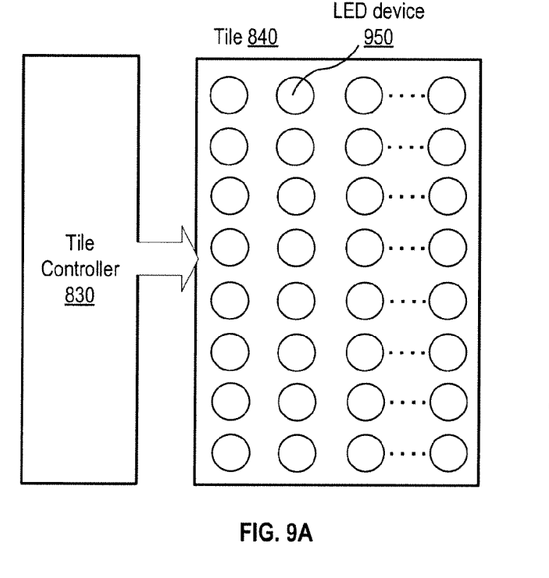
FIG. 9A, FIG. 9B and FIG. 9C illustrate embodiments of a tile-based display panel.
Figure 9B:
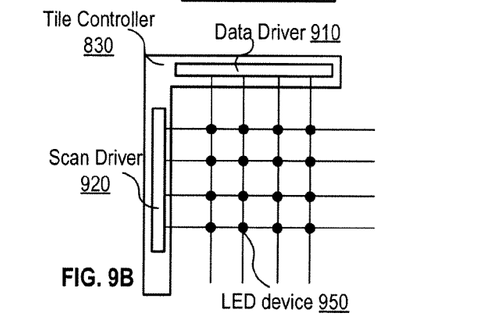
Figure 9C:
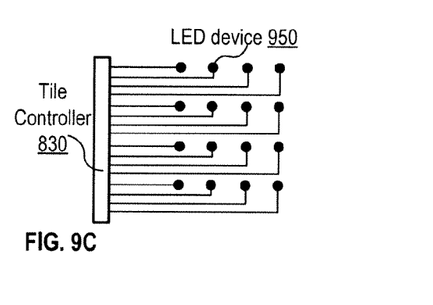

FIG. 8 illustrates an alternative embodiment of a system 800 in which the adaptive refresh schemes described above may apply. The system 800 includes a processor (such as the processor 110 of FIG. 1) and a display controller 820. The display controller 820 controls a set of tile controllers 830 and each tile control 830 controls a tile 840. The tiles 840, which form the display panel 120, can be arranged into any geometric shapes, such as a line, a rectangle, a circle, and the like. An example of the tile 840, shown in FIG. 9A, includes an array of LED devices 950 (or micro LED devices). FIG. 9B illustrates an embodiment in which the LED devices 840 form a passive matrix which are arranged as rows and columns, where the rows are driven by a scan driver 920 and the columns are driven by a data driver 910. The scan driver 920 and the data driver 910 may be part of the tile controller 830 or may be coupled to the tile controller 830. FIG. 9C illustrates another embodiment in which each LED device 840 is directly driven by the tile controller 830 via a direct connection to the tile controller 830.

In the embodiment of FIG. 8, a tile that has content change beyond a threshold or has reached a time out threshold will be refreshed. As described above with reference to FIG. 1 and FIG. 2, the determination of whether a tile should be refreshed is made by the refresh logic 115. The refresh logic 115 and the frame buffer 130 may be located within the processor 110 or the display controller 820, or otherwise coupled to the processor 110 or the display controller 820. The refresh logic 115 may compare a tile of data in a current frame with a corresponding tile in a previous frame to determine whether the tile is to be refreshed in the current frame. The frame buffer 130 holds the tiles that are being compared. In alternative embodiments, instead comparing and refreshing one tile at a time, multiple tiles ("tile segment") may be compared and refreshed at a time.

As described above, location of the refresh logic 115 and the signal it sends to its downstream component can affect the data transfer rate along the data path into the display panel 120. For example, if the refresh logic 115 is located within the processor 110, the processor 110 may send only the data that needs to be refreshed downstream, thereby reducing the data transfer rate along the path from the processor 110 to the display panel 120. If the refresh logic 115 is located with the display controller 820, the display controller 820 may send only the data that needs to be refreshed downstream, thereby reducing the data transfer rate along the path from the display controller 820 to the display panel 120. It is understood that for simplicity of the description, not all of the possible scenarios are described herein.

In some embodiments as shown in FIG. 9C, adaptive refresh may be performed on the individual LED devices 950 such that only those LED devices 950 that need a refresh are refreshed. Thus, some of the LED devices 950 may be refreshed while some of the other LED devices 950 within the same tile are not refreshed. The details of the refresh operations are similar to, or the same as, the operations described above with respect to the display system 100 of FIG. 1 and FIG.2 and therefore are not repeated herein.

In utilizing the various aspects of this invention, it would become apparent to one skilled in the art that combinations or variations of the above embodiments are possible for performing adaptive refresh. Although the present invention has been described in language specific to structural features and/or methodological acts, it is to be understood that the invention defined in the appended claims is not necessarily limited to the specific features or acts described. The specific features and acts disclosed are instead to be understood as particularly graceful implementations of the claimed invention useful for illustrating the present invention.

What is claimed is:

1. An active matrix display system comprising:
    an active matrix display panel that includes a plurality of multi-dimensional tiles, each tile including of a plurality of display elements;
    a refresh logic coupled with the active matrix display panel, the refresh logic to determine, within a single data frame, to selectively refresh or not refresh each tile of display elements; and
    three or more tile controllers coupled to the refresh logic, each tile controller including a scan driver and a data driver, wherein to refresh a tile of the plurality of multi-dimensional tiles, the scan driver is to select one or more rows of the plurality of display elements within a tile to receive data signals and a data driver is to provide the data signals to the selected one or more rows of display elements.

2. The active matrix display system of claim 1, additionally including a display controller coupled to each tile controller.

3. The active matrix display system of claim 2, wherein the refresh logic is located within the display controller.

4. The active matrix display system of claim 2, additionally including a processor to generate data frames, the processor coupled to the display controller.

5. The active matrix display system of claim 4, wherein the refresh logic is located within the processor.

6. The active matrix display system of claim 5, wherein the refresh logic is to cause the processor or a hardware component on a path between the processor and the display panel to reduce a data transfer rate to the display panel.

7. The active matrix display system of claim 1, wherein a first tile controller is to signal the scan driver of a first tile to perform no refresh operation during a refresh cycle in which the first tile was scheduled to be refreshed.

8. The active matrix display system of claim 7, wherein a second tile controller is to signal the scan driver of a second tile to refresh the second tile instead of the first tile during a refresh cycle in which the first tile was scheduled to be refreshed.

9. The active matrix display system of claim 8, wherein the refresh logic is to signal the second tile controller to refresh a first subset of rows within the second tile and not refresh a second subset of rows within the second tile.

10. The active matrix display system of claim 9, wherein the second tile controller is to signal the scan driver to refresh a first subset of rows that display a dynamic content at a higher refresh rate than a second, separate subset of rows that display a static content.

11. The active matrix display system of claim 1, wherein a scan driver of a tile controller is to directly address a selected display element within a tile and the refresh logic is configurable to selectively refresh one or more tiles of display elements without refreshing all display elements within the display.

12. The active matrix display system of claim 1, wherein each display element of the display panel includes one or more micro light emitting diode (LED) devices of 1 to 100 μm scale.

13. A method for refreshing a display panel comprising:
refreshing a first portion of the display panel at a first refresh rate, wherein the first portion of the display panel includes a set of one or more multi-dimensional tiles of display elements configured to display a static content;
refreshing a second, separate portion of the display panel at a second refresh rate higher than the first refresh rate, wherein the second portion displays a dynamic content, the second portion of the display panel including a separate, second set of multi-dimensional tiles of display elements; and
wherein refreshing the first portion and the second portion includes providing a refresh signal to the multi-dimensional tiles of display elements of the first portion and the second portion via three or more tile controllers, each tile controller coupled to one or more of the multi-dimensional tiles.

14. The method of claim 13, further comprising:
comparing content of the first portion in a current data frame with content of the first portion in a previous data frame to generate a comparison result; and
determining whether the first portion displays the static content based on the comparison result.

15. The method of claim 13, further comprising:
performing no refresh operation during a cycle in which the first portion was scheduled to be refreshed.

16. The method of claim 13, further comprising:
refreshing the second portion instead of the first portion during a cycle in which the first portion was scheduled to be refreshed.

17. The method of claim 13, further comprising:
refreshing each portion of the display panel sequentially in a first frame cycle;
refreshing selected portions of the display panel that have a content change subsequent to the first frame cycle and before a second frame cycle; and
refreshing each portion of the display panel sequentially in the second frame cycle.

18. The method of claim 13, further comprising:
refreshing each portion of the display panel when the portion of the display panel has reached a time out threshold.

19. The method of claim 13, wherein each display element of the display panel includes one or more micro light emitting diode (LED) devices of 1 to 100 μm scale.

20. The method of claim 13, additionally comprising selectively refreshing or not refreshing individual display elements within each portion of the display panel.

21. An apparatus comprising:
a frame buffer to store a first portion and a second, separate portion of a current data frame and a corresponding first portion and a corresponding second, separate portion of a previous data frame, each portion of the data frame associated with a separate multi-dimensional tile of display elements;
refresh logic coupled to the frame buffer, the refresh logic to compare content of the first portion of the current data frame with content of the corresponding first portion of the previous data frame and compare content of the second, separate portion of the current data frame with content of the corresponding second, separate portion of the previous data frame to generate a comparison result, and to determine to refresh the first portion of the current data frame and to not refresh the second, separate portion of the current data frame on a display panel based on the comparison result; and
control logic coupled to the refresh logic, the control logic to indicate whether refresh of the first portion is activated or ignored, the control logic including three or more tile controllers, each tile controller to provide a refresh signal to one or more of the multi-dimensional tiles of display elements.

22. The apparatus of claim 21, wherein the refresh logic is to identify a next portion in the current data frame to be refreshed and send an index of the next portion to the control logic.

23. The apparatus of claim 21, wherein the refresh logic is to determine whether a next portion in a sequential order of the current data frame is to be refreshed, and to cause a control signal to be sent to the control logic to indicate whether refresh of the next portion is activated or ignored.

24. The apparatus of claim 23, wherein the control logic is to cause the next portion in the sequential order of the current data frame to be refreshed instead of the second, separate portion of the display panel during a refresh cycle in which the second, separate portion of the display panel was scheduled to be refreshed.

25. The apparatus of claim 21, wherein the refresh logic is located within a display system coupled to a graphics processing unit (GPU), within a GPU, or within a hardware component coupled between a GPU and a display system.

26. The apparatus of claim 21, wherein the refresh logic is to assign different refresh rates to different portions of the display panel.

27. The apparatus of claim 21, wherein the refresh logic causes the second, separate portion of the display panel to be refreshed when the second, separate portion has reached a time out threshold.

28. The apparatus of claim 21, wherein each display element includes one or more micro LED devices of 1 to 100 μm scale.

* * * * *